United States Patent Office
3,446,232
Patented May 27, 1969

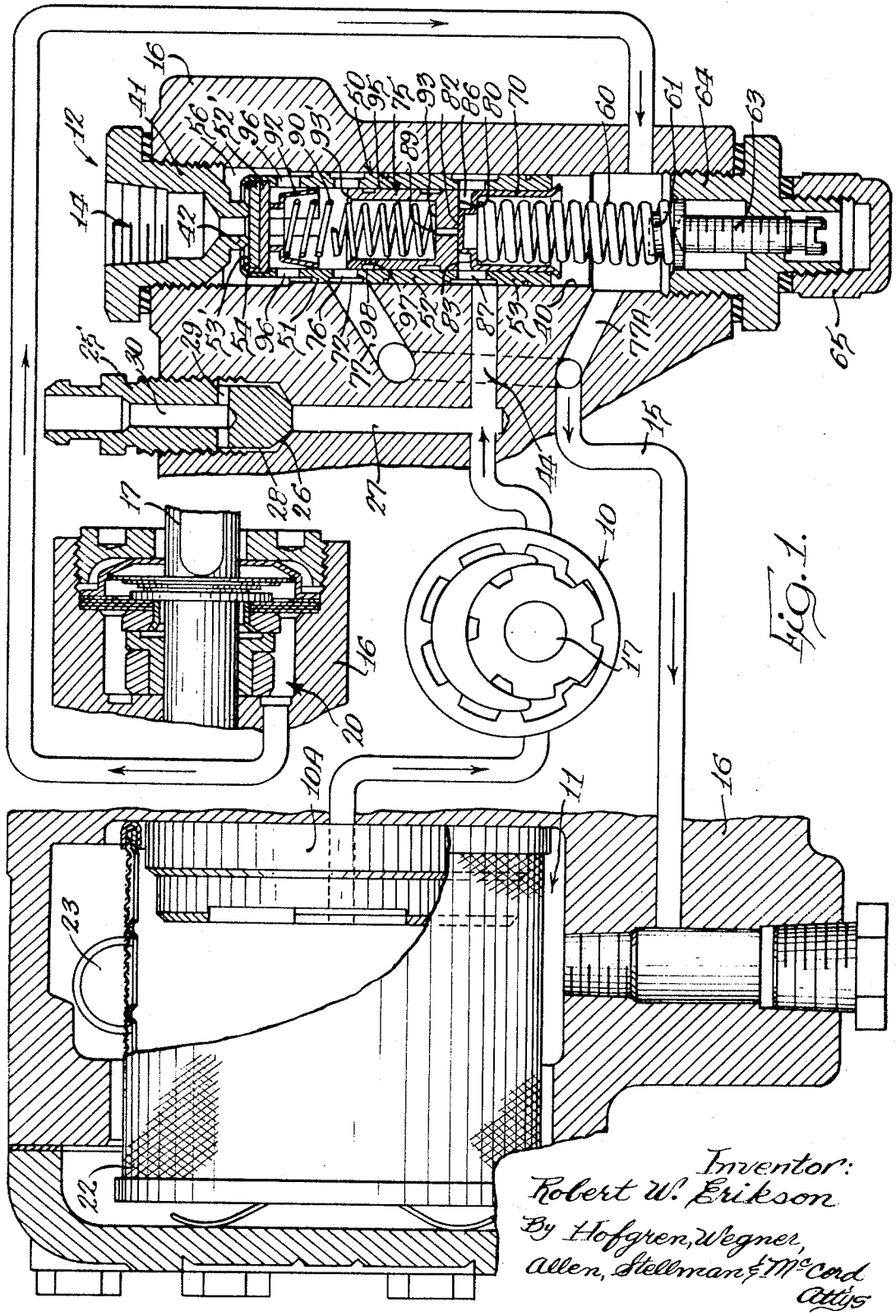

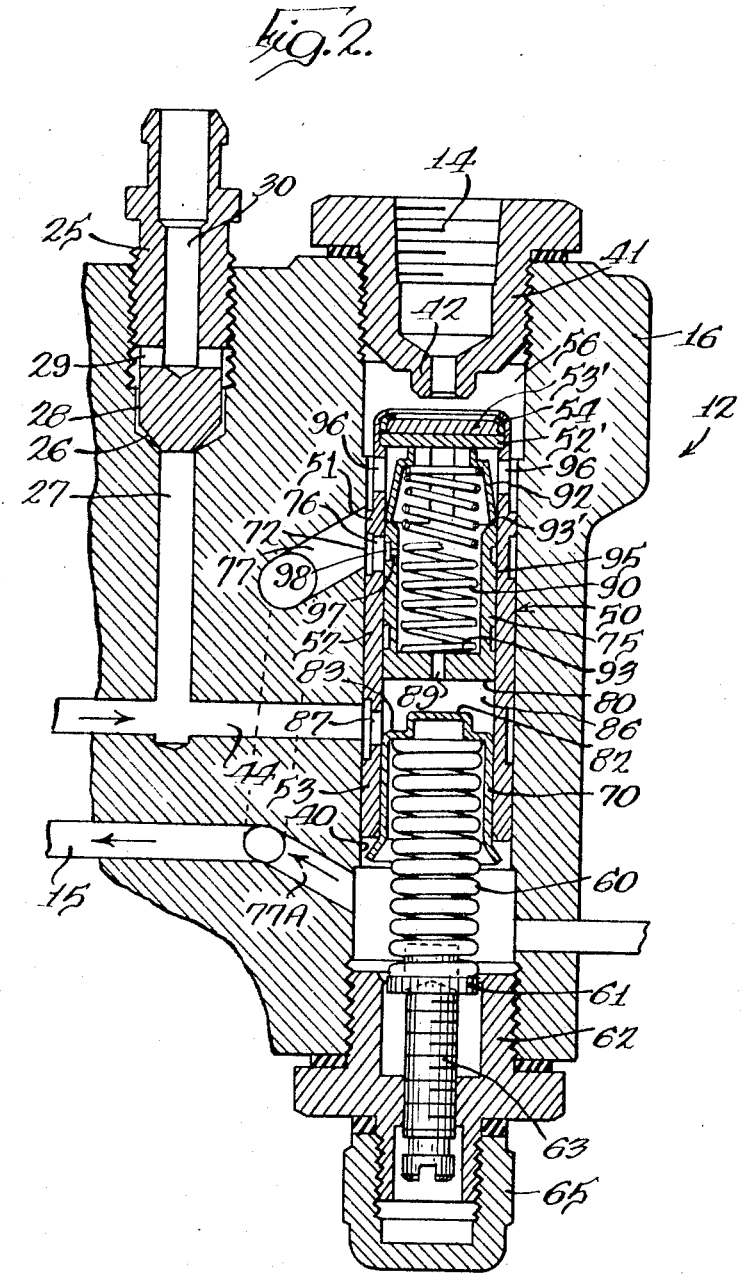

3,446,232
FUEL REGULATING VALVE
Robert W. Erikson, Rockford, Ill., assignor to Sundstrand Corporation, a corporation of Delaware
Filed Sept. 15, 1967, Ser. No. 667,949
Int. Cl. G05d 7/00; F04b 49/08
U.S. Cl. 137—117
7 Claims

ABSTRACT OF THE DISCLOSURE

An oil burner regulating valve for controlling the flow of fuel to burner nozzles with a flow responsive valve in the regulating valve for controlling the flow of fuel from a pump to the regulating valve to provide high pump r.p.m. start-up and cut-off of the fuel supply by the regulating valve, in combination with a bleed passage in the flow responsive valve for providing high cut-off r.p.m. when the flow responsive valve sticks.

Background of the invention

This invention relates generally to fuel pumps and more particularly to a regulating valve for oil burner pumps of the type described in the copending application of Nils E. Swedberg entitled, "Fuel Regulating Valve," Ser. No. 557,056, filed June 13, 1966, and assigned to the same assignee of the present invention.

As described in the above copending application, one of the basic problems in fuel oil regulating valves of this general character is that transient variations in the fuel oil discharge from the nozzles both at start-up and at shut-down cause highly undesirable smoking in the combustion chamber at these times. Various means have been provided in the past in attempts to effect rapid valve action and minimize the problem of smoking, but to a large extent the solutions have not solved all of the problems of a valve for this purpose, and have had certain characteristics that detract from the performance of the regulating valve.

To obviate this problem an additional valve, as described in the above Swedberg application, has been provided in series with the regulating valve which closes bypass ports to direct fuel from the pump to the regulating valve only after the pump has reached a high r.p.m. and the fuel oil pressure is at a high level thereby reducing or eliminating smoking in the combustion chamber at start-up. Furthermore, during shutdown of the pump, the flow-responsive valve opens the bypass ports at a high pump r.p.m., preventing the flow of fuel oil under pressure to the regulating valve thereby permitting the regulating valve to rapidly close, cutting off the supply of fuel oil to the nozzles.

Summary of the invention

The present invention represents an improvement over regulating valve constructions of the type described above in that it provides a rapid closure of the main regulating valve even when the secondary flow-responsive valve fails. That is, in the prior device, when the flow-responsive valve does not operate properly on pump shut-down to by-pass fluid from the valve chamber associated with the regulating valve, the regulating valve closes very slowly and shuts the burner nozzle outlet only when the pump has reached a very low speed.

In accordance with the present invention, bleed passages are provided in the flow-responsive valve for continuously communicating the main regulating valve chamber with a low pressure return when the flow-responsive valve sticks in its normal operating position (closing the bypass ports otherwise communicating with the main regulating valve chamber) during pump shut-down. Fuel in the chamber will escape through the bleed passages permitting rapid closure of the main regulating valve notwithstanding the failure of the flow-responsive valve.

It should be understood in connection with the above description that the present improvement is not necessarily limited to the specific regulating valve construction shown in the Swedberg application, or the specific flow-responsive valve disclosed therein. It may be provided in conjunction with any valve in series with the main regulating valve for the purpose of controlling the flow thereto to effect high r.p.m. main valve cut-off.

Brief description of the drawings

FIG. 1 is a schematic illustration of a fuel circuit for an oil burner including a regulating valve assembly in accordance with the present invention; and
FIG. 2 is a fragmentary view of the regulating valve shown in FIG. 1 in the operating, fuel supply position.

Specific description

As shown in FIG. 1, an internal gear pump 10 of the crescent type is provided for drawing fuel oil from a reservoir 11 and delivering it under pressure to a regulating valve assembly 12 which serves to regulate the flow of fuel to a burner nozzle (not shown) through burner nozzle outlet port 14. The valve 12 also serves to bypass a portion of the fuel from the pump 10 back to the reservoir through a return passage 15. The pump 10, the reservoir 11 and the regulating valve 12, in addition to the associated passages, are housed or formed within a single housing assembly 16, although they are shown separately in the drawing for clarity. Pump 10, while shown schematically in FIG. 1, actually is mounted in a housing member 10a within reservoir 11. The pump 10 is driven by a suitable motor (not shown) through a pump shaft 17 adapted to be connected to a driving electric motor. Further, a suitable filter 22 is provided in the reservoir 11 for filtering fluid entering the reservoir through the bypass or return passage 15 or through a make-up port 23 which may be used to supply additional fluid to the reservoir as needed.

An air purging valve 25 is provided threaded in the housing 16 for purging fuel (with air entrained) supplied from the pump 10 to the regulating valve 12 after initial installation or extended shut-down. In brief, a conical seating surface 26 on the end of valve 25 engages a complementary seat in the housing 16 preventing the escape of fluid through passage 27 which continually communicates with the outlet of the pump 10. When opened, however, by unthreading the valve 25, fluid is permitted to pass through passage 27 around a reduced portion 28 on the valve through passages 29 and 30 and out into a suitable receptacle adjacent the unit.

The regulating valve assembly 12 is provided for the purpose of regulating the flow of fuel from the pump 10 through the burner nozzle outlet 14, as described above. It includes a cylindrical valve bore 40 in housing 16 with a burner nozzle outlet fitting 41 threaded in one end thereof having a central projection 42 extending within the bore and defining a stationary valve seat on the end thereof.

An outlet passage 44, formed in the housing 16, connects the outlet of the pump 10 with a central portion of the valve bore 40. The return passage 15 communicates with one end of the bore for conveying fluid therein back to the reservoir 11.

Slidable in the bore 40 is a main regulating hollow spool valve member 50 having spaced annular lands 51, 52 and 53 thereon. The upper end of the hollow valve member 50 is closed by a back-up washer 52' contiguous with a resilient washer 53' both retained within the end of the spool member by retaining collar 54. The resilient washer 53′ engages the valve seat on the outlet projection 42 and prevents flow, in the position shown, from a chamber 56 (defined by the valve member 50 in the valve bore) through the outlet port 14.

A coil compression spring 60 is provided for biasing the valve member 50 toward its closed position wherein washer 53′ engages the stationary outlet seat 42. The lower end of coil spring 60 reacts against an abutment 61 carried by an adjustable screw 63 threaded in a fitting 64 which is in turn threaded in the housing 16. A suitable cap 65, provided for the fitting 64, may be removed so that the screw 63 may be rotated to adjust the compressive force of the spring 60 on the valve member 50 to thus vary the regulated pressure of fuel oil through the outlet 14. The other end of the compression spring 60 reacts against a spring seat 70 fixed within the lower end of valve member 50.

When sufficient fluid pressure occurs in chamber 56 (as shown in FIG. 2) acting on the upper end of valve member 50, the valve will move downwardly against the force of spring 60 permitting fuel to flow out the outlet port 14 to the burner nozzles. Spring 60 will then regulate a constant pressure flow in the outlet port 14. The land 51 is positioned so that after the valve member 50 moves downwardly to its regulating position, the upper end of the land will be below port 72 permitting excess fuel oil to be bypassed through a bypass passage 77 communicating with the lower end of the bore 40 (through passage 77a) and the return passage 15 so that a portion of the fuel bypasses and returns to the reservoir 11.

Another hollow valve member 75 is provided slidable within the valve member 50 for controlling the flow of fuel from supply passage 44 to the valve chamber 56 and for controlling flow through vent ports 76 in valve member 50 between lands 51 and 52. These vent ports communicate with the bypass passage 77.

The valve member 75 has a flat valve seat 80 engageable with a complementary flat valve seat 82 formed on the inner end of the spring seat 70. The spring seat 70 also has a surface 83 defining with the surface 80 an annular chamber 86 formed within the valve member 50 in continuous communication with the passage 44 through ports 87 extending through valve member 50 between lands 52 and 53.

An orifice 89 extends centrally through the valve member 75 and is adapted when the valve member is open to convey fluid from chamber 86 into the hollow interiors of valve members 75 and 50. Valve member 75 is biased to its closed position shown by a coil compression spring 90 mounted at one end on a spring seat 92 fixed within valve member 50, and reacting at its other end against surface 93 within the valve member 75 pushing it downwardly against the spring seat 70. Seat 92 is slotted to provide free communication between the interior of the valve members 50, 75 and the chamber 56 through ports 96 in valve member 50. The seat 92 also serves as a stop for the valve member 75 in its open or operating position shown in FIG. 2.

An upper portion 95 (FIG. 2) of the valve member 75 closes the vents 76 as the valve member 75 opens, thereby substantially preventing the flow of fuel from the interior of the valve members and the valve chamber 56 out the vents to thereby subject the upper end of the valve member to full supply pressure through ports 96 in the upper end of the valve member 50.

The valve member 75 is a differential flow responsive valve, with supply fluid pressure acting on surface 80 urging the valve member 75 upwardly toward its open position, and supply fluid at a pressure determined by the pressure drop across orifice 89 acting on the inner surfaces 93 and 93′ urging the valve member 75 downwardly to its closed position with the spring 90. Therefore, there is a net hydraulic force acting on the valve member 75 in a direction with the flow through the orifice 89 depending upon the pressure drop across the orifice. This net hydraulic force acting on valve member 75 will oppose and compress the spring 90 until contact is attained between the differential valve 75 and seat 92. Hence, the travel of the valve 75 is not governed by the flow through the orifice 89.

At the lower flows, the fluid flow from the orifice 89 will flow through the vent ports 76 and out the bypass passage 77 back to the reservoir 11. This lowers the starting torque requirements on the pump 10. The orifice 89 is sized so that valve member 75 requires a high rate of flow and high pump r.p.m. before it closes vents 76, and until vents 76 are closed, the pressure in the valve chamber 56 is at a low value.

As thus far described, the operation of the valve assembly is as follows: when the pump 10 is initially started after installation or extended shut-down, the purging plug 25 is unseated permitting the fuel and air mixture to flow through passage 27 and out through the central bore 40 of the purging valve. At this time, the spring 90 is of sufficient strength compared with the low hydraulic force of fluid on surface 80 to maintain the valve member 75 closed so that air and oil may not enter the orifice 89 and are blocked from entering either the valve chamber 56 or the return line 77.

On most starts purging is unnecessary and the valve 25 is seated. The discharge from the pump through passage 44 is in proportion to the speed of rotation of shaft 17. The supply fluid from the pump enters chamber 86 and as pressure builds up to a predetermined valve, the member 75 will open permitting supply flow through orifice 89. As the flow through orifice 89 increases, the valve member 75 will move upwardly and close the vents 76 at a predetermined flow, and until this time the valve chamber 56 is at low return pressure. When the vents are closed, the pressure within the valve members 75 and 50, as well as in the valve chamber 56, rapidly increases and the force of the fluid acting on the upper end of the valve member 50 opposing the main spring 60, rapidly reaches a magnitude where it overcomes the main spring force. The valve member 50 will then move downwardly lifting the valve washer 53′ from the outlet nozzle seat and permitting fuel flow through the nozzle outlet 14 to the burner nozzles. The limited delay time from the pump start-up until a sufficient pressure occurs in chamber 56 to open the main valve member 50, lowers the starting torque requirement on the pump and results in a high fuel oil pressure and high pump r.p.m. at the time the valve member 50 opens to eliminate or reduce smoking at start-up.

With the valve member 50 open, the spring 60 serves to regulate a constant pressure flow of fuel to the burner nozzles through the port 14. During normal operation, the valve member 50 moves to a point where the upper surface of land 51 moves below the port 72 permitting excess oil to flow into the bypass passage 77 to the reservoir through the return passage 15.

When the motor is shut off when shut-down is desired, the flow from the pump begins to decrease causing a corresponding decrease in the pressure drop across orifice 89. This reduction in the pressure drop decreases the net hydraulic force acting on the valve member 75 causing the spring to move the valve member toward its closed position. When the flow is decreased to a predetermined, but still high, value, the valve 75 will uncover the vents 76 causing the hydraulic pressure within the valve members and the valve chamber 56 to drop rapidly to a low value on the order of zero p.s.i. The valve land 51 is never wide enough to close off the lower edge of port 72. The low pressure in chamber 56 upsets the balance between the force of the main spring 60 and the hydraulic force acting on the upper end of valve member 50 so that the valve member 50 will move rapidly to its closed position shown in FIG. 1, cutting off the supply of fuel to the nozzles. It is this sudden pressure loss in the valve chamber 56 and within the valve members when the vents 76 are uncovered that permits a fast cut-off of the fuel flow to the nozzles at a high pump r.p.m.

Further decrease in the supply flow causes the spring 90 to urge the valve member 75 to its fully closed position engaging the spring seat 70.

Due to the rapid pressure build-up in chamber 56 after the vents 76 are closed and the sudden loss of pressure in this chamber when the vents are open, the valve 50 will maintain a constant pressure flow through the outlet nozzle 14 from the instant the valve opens to the instant it closes.

The operation of the regulating valve described above assumes the proper functioning of the valve members. One or more orifices 97 are provided in valve member 75 which effect rapid closure of the main regulating valve 50 in the event that the valve 75 sticks in its operating position shown in FIG. 2. Orifice 97 communicates with the interior of valve member 75 and an annular recess 98 in land portion 95 of valve 75. Thus, when the valve members 50, 75 are in their normal running position shown in FIG. 2, the orifice 97 and recess 98 are aligned with vent ports 76 so that a portion of the fluid flowing to the nozzle chamber 56 is continuously bypassed through the vent ports 76 to the return passage 15.

If on shut-down of the pump 10 the valve member 75 sticks in the position shown in FIG. 2, this prevents the full communication of ports 76 with the interior of the valve members, and as described above such communication is preferably the means by which valve 75 vents chamber 56 to provide rapid closure of valve member 50. However, since orifice 97 still provides a bypass of a portion of the fluid flowing into the interior of the valve members and chamber 56 from the pump, the valve member 50 will still close rapidly. For example, assuming that the pump 10 has a normal operating speed of 1,725 r.p.m., the normal closure of regulating valve 50 would be approximately at 1,100 to 1,300 r.p.m. If the valve member 75 were to stick in the position shown in FIG. 2, in the absence of orifice 97, the valve 50 would not close until the pump speed reached a low of approximately zero to 200 r.p.m. causing considerable smoke formation in the combustion chamber. The resulting soot accumulation on the heat exchange surfaces in the associated burner (not shown) would substantially reduce the overall heating efficiency. With the provision of orifice 97 and recess 98, the valve member 50 can be made to close at from 800 to 1,000 r.p.m. of pump 10 when the valve member 75 sticks in the position shown in FIG. 2. Of course, if the valve 75 does not stick, the main valve 50 will still close between 1,100 to 1,300 r.p.m., as noted above. Thus, the orifice 97 has no effect on shut-down performance or lift when the valve members 50, 75 function normally. While there is a small decrease in the flow capacity through the outlet nozzle 14 as a result of flow through the orifice 97, this capacity reduction is not significant in terms of commercially acceptable capacity ratings.

An additional advantage in the location of the orifice 97 is that it will not adversely affect proper purging of the unit. That is, when purge plug 25 is removed during purging, the valve member 75 will be in its closed position shown in FIG. 1, blocking any fuel flow to the interior of the valve members 50, 75, so that purging may be effected without recirculating any air-entrained oil back to the pump.

I claim:

1. A fuel burner valve device for controlling the flow of fuel between a fuel pump and a burner nozzle, comprising: passage means for supplying fluid from said pump, a regulating valve including a valve chamber having a burner nozzle outlet port therein, said passage means being connected to supply fluid to said chamber, a valve member in said chamber movable from a closed position preventing the flow of fluid from said chamber through said burner nozzle port and an open position permitting fluid flow through said nozzle port, means biasing said valve member to its closed position, valve means movable independently of said valve member between said pump and said chamber responsive to flow from said pump for venting the fluid in said chamber when the flow from the pump falls below a predetermined value, and second passage means for porting fluid from said chamber on shut-down of said pump if said valve means fails to vent the fluid in said chamber.

2. A fuel burner valve device for controlling the flow of fuel between a fuel pump and a burner nozzle, comprising: passage means for supplying fluid from said pump, a regulating valve including a valve chamber having a burner nozzle outlet port therein, said passage means being connected to supply fluid to said chamber, a valve member in said chamber movable from a closed position preventing the flow of fluid from said chamber through said burner nozzle port and an open position permitting fluid flow through said nozzle port, means biasing said valve member to its closed position for controlling the flow of fluid from the passage means to the valve chamber, valve means separately movable from said valve member for venting fluid from said chamber when the fuel pump shuts down, second passage means for porting fluid from said chamber on shut-down of said pump if said valve means fails to operate properly and a bypass valve for bypassing a portion of the fluid so that only a portion thereof passes through the outlet port when said valve member is open.

3. A fuel burner valve device for controlling the flow of fuel between a fuel pump and a burner nozzle, comprising: passage means for supplying fluid from said pump, a regulating valve including a valve chamber having a burner nozzle outlet port therein, said passage means being connected to supply fluid to said chamber, a valve member in said chamber movable between a closed position preventing the flow of fluid from said chamber through said burner nozzle port and an open position permitting fluid flow through said nozzle port, means biasing said valve member to its closed position, valve means movable separately from said valve member for substantially blocking flow from said chamber during normal operating speeds of the pump except through said outlet port and for bypassing flow to the chamber when the pump speed falls below normal operating speeds, and second passage means for porting fluid from said chamber until the valve member is in closed position whereby a high pump r.p.m. shut-down is provided even if the valve means fails to operate properly and continues to substantially block flow from said chamber on shut-down.

4. A fuel burner valve device for controlling the flow of fuel between a fuel pump and a burner nozzle, comprising: passage means for supplying fluid from said pump, a regulating valve including a valve chamber having a burner nozzle outlet port therein, said passage means being connected to supply fluid to said chamber, a valve member in said chamber movable between a closed position preventing the flow of fluid from said chamber through said burner nozzle port and an open position permitting fluid flow through said nozzle port, means biasing said valve member to its closed position, valve means between said pump and said chamber responsive to flow from said pump for venting said chamber when the flow from the pump falls below a first predetermined value, and for substantially preventing the venting of flow relative to said chamber when the flow from the pump is above said first predetermined value, second passage means in said valve means for continuously permitting bleed flow from said chamber when the valve means is in a position preventing the venting of flow relative to said chamber, a purge valve in said first passage means to purge the system of air when desired, said valve means preventing communication between said purge valve and said second passage means at pump speeds below said second predetermined value whereby entrained air is not recirculated during purging.

5. A fuel burner valve device for controlling the flow of fuel between a fuel pump and a burner nozzle, comprising: passage means for supplying fluid from said pump, a regulating valve including a valve chamber having a burner nozzle outlet port therein, said passage means being connected to supply fluid to said chamber, a valve member in said chamber movable from a closed position preventing the flow of fluid from said chamber through said burner nozzle port and an open position permitting fluid flow through said nozzle port, means biasing said valve member to its closed position, valve means between said pump and said chamber responsive to flow from said pump for preventing the flow of fluid to said chamber when the flow from the pump falls below a predetermined value, second passage means for porting fluid from said chamber on shut-down of said pump if said valve means fails to prevent the flow of fluid to said chamber, said valve means including a second valve member slidable in said regulating valve, said second valve member being movable from a closed position blocking flow from said first passage means to said valve chamber to an open position permitting flow from said first passage means to said chamber, means biasing said second valve member to its closed position, said valve member being responsive to flow in said first passage means and having an orifice therein constructed to convey fluid from said first passage means to said chamber, and port means in said regulating valve continuously communicating with a low pressure return, said second valve member having land means thereon providing communication between said regulating valve port means and said chamber when said valve member is in its closed position and substantially blocking communication between said port means and said chamber when said second valve member is in its open position, said second passage means being defined in said land means and providing bleed communication between said chamber and said port means when the second valve member is in its open position.

6. A fuel burner valve device for controlling the flow of fuel between a fuel pump and a burner nozzle, comprising: passage means for supplying fluid from said pump, a regulating valve including a valve chamber having a burner nozzle outlet port therein, said passage means being connected to supply fluid to said chamber, a valve member in said chamber movable from a closed position preventing the flow of fluid from said chamber through said burner nozzle port and an open position permitting fluid flow through said nozzle port, means biasing said valve member to its closed position, valve means between said pump and said chamber responsive to flow from said pump for preventing the flow of fluid to said chamber when the flow from the pump falls below a predetermined value, and second passage means for porting fluid from said chamber on shut-down of said pump if said valve means fails to prevent the flow of fluid to said chamber, said regulating valve having bypass valve means operable upon predetermined movement of said regulating valve to bypass a portion of the fluid in said first passage means so that only a portion of the fluid passes through said outlet port when the pump is at operating speeds.

7. A fuel burner valve device for controlling the flow of fuel between a fuel pump and a burner nozzle, comprising: passage means for supplying fluid from said pump, a regulating valve including a valve chamber having a burner nozzle outlet port therein, said passage means being connected to supply fluid to said chamber, a valve member in said chamber movable from a closed position preventing the flow of fluid from said chamber through said burner nozzle port and an open position permitting fluid flow through said nozzle port, means biasing said valve member to its closed position, valve means movable independently of said valve member between said pump and said chamber responsive to flow from said pump for venting the fluid in said chamber when the flow from the pump falls below a predetermined value, and second passage means in said valve means for porting fluid from said chamber on shut-down of said pump.

References Cited
UNITED STATES PATENTS 2,358,875    9/1944    Nichols.

WILLIAM F. O'DEA, *Primary Examiner.*

WILLIAM H. WRIGHT, *Assistant Examiner.*

U.S. Cl. X.R.

103—42; 137—108, 115